US012060252B2

(12) United States Patent
Hetz et al.

(10) Patent No.: US 12,060,252 B2
(45) Date of Patent: Aug. 13, 2024

(54) LIFTING GEAR

(71) Applicant: MULTIVAC SEPP HAGGENMUELLER SE & CO. KG, Wolfertschwenden (DE)

(72) Inventors: Maximilian Hetz, Haldenwang (DE); Stefan Oberschachtsiek, Ottobeuren (DE)

(73) Assignee: MULTIVAC SEPP HAGGENMUELLER SE & CO. KG, Wolfertschwenden (DE)

(*) Notice: Subject to any disclaimer, the term of this patent is extended or adjusted under 35 U.S.C. 154(b) by 246 days.

(21) Appl. No.: 17/560,541

(22) Filed: Dec. 23, 2021

(65) Prior Publication Data

US 2022/0194761 A1 Jun. 23, 2022

(30) Foreign Application Priority Data

Dec. 23, 2020 (DE) ......................... 102020134816.9

(51) Int. Cl.
*B66F 3/46* (2006.01)
*B65B 65/02* (2006.01)
*B66F 3/24* (2006.01)

(52) U.S. Cl.
CPC ................ *B66F 3/46* (2013.01); *B65B 65/02* (2013.01); *B66F 3/245* (2013.01)

(58) Field of Classification Search
CPC ........... B65B 65/02; B65B 51/14; B65B 9/04; B30B 1/10; B30B 7/04; B66F 3/245; B66F 3/46
See application file for complete search history.

(56) References Cited

U.S. PATENT DOCUMENTS

| | | | | |
|---|---|---|---|---|
| 364,995 A | 6/1887 | Drew | | |
| 5,819,510 A * | 10/1998 | Bochtler | ................ | B65B 65/02 53/559 |

(Continued)

FOREIGN PATENT DOCUMENTS

| | | |
|---|---|---|
| DE | 24 12 746 A1 | 10/1975 |
| DE | 197 02 889 A1 | 7/1997 |

(Continued)

OTHER PUBLICATIONS

DE 10 2006 006 218 A1, Abstract & Machine Translation, Donges, Han Guenter; Aug. 16, 2007.

(Continued)

*Primary Examiner* — Thomas M Wittenschlaeger
(74) *Attorney, Agent, or Firm* — Brooks Kushman P.C.

(57) ABSTRACT

The disclosure relates to a lifting gear for opening and closing a workstation of a packaging machine, wherein the lifting gear includes a stationarily mounted base, a lifting platform mounted to be height adjustable with respect to the base along a lifting axis for supporting a lower tool part of the workstation, and an adjusting mechanism comprising a drive unit and a toggle means on which the lifting platform is mounted, wherein the adjusting mechanism furthermore includes a pressure part coupled with the toggle means and adjustable by means of the drive unit along the lifting axis, wherein by the displacement of said pressure part along the lifting axis, the toggle means can be actuated for a height adjustment of the lifting platform.

18 Claims, 7 Drawing Sheets

(56) References Cited

U.S. PATENT DOCUMENTS

| | | | | |
|---|---|---|---|---|
| 6,006,505 A * | 12/1999 | Natterer | B65B 65/02 53/374.8 |
| 11,713,152 B2 * | 8/2023 | Waegele | B65B 9/04 53/453 |
| 2002/0023417 A1 * | 2/2002 | Becker | B65B 65/02 53/559 |
| 2013/0312551 A1 * | 11/2013 | Ehrmann | F16H 21/22 74/44 |

FOREIGN PATENT DOCUMENTS

| | | |
|---|---|---|
| DE | 10 2006 006 218 A1 | 8/2007 |
| DE | 10 2012 003 839 A1 | 8/2013 |
| EP | 0 895 933 A1 | 2/1999 |
| EP | 3 294 636 B1 | 2/2019 |

OTHER PUBLICATIONS

EP 0 895 933 A1, U.S. Pat. No. 6,006,505; Dec. 28, 1999; Natterer.

EP 3 294 636 B1, Machine Translation (Abstract, Description & Claims of Corresponding Document WO 2016180587 A1), Runte, Frank; Feb. 27, 2019.

European Search Report (with English Machine Translation) Dated Apr. 19, 2022, Application No. 21204898.7-1014, Applicant MULTIVAC Sepp Haggemueller SE & Co. KG, 12 Pages.

* cited by examiner

LIFTING GEAR

CROSS-REFERENCE TO RELATED APPLICATIONS

This application claims foreign priority benefits under 35 U.S.C. § 119(a)-(d) to German patent application number DE 10 2020 134 816.9, filed Dec. 23, 2020, which is incorporated by reference in its entirety.

TECHNICAL FIELD

The present disclosure relates to a lifting gear which is formed at a packaging machine for opening and closing a workstation formed thereon.

BACKGROUND

EP 0 895 933 A1 discloses a lifting means having a lever system coupled to the adjusting movement of a lower tool part for lifting a base of the lifting means and an upper tool part firmly connected thereto. In this device, a lowering of the lower tool part into the opened position of the lifting means simultaneously causes, via the lever system, a lifting of the base mounted to be height adjustable and thus of the complete lifting means relative to the machine frame to thus space apart the upper tool part from an upper foil guided under it. For the operation of this lifting means, a plurality of adjusting drives and guides is employed whereby the lifting means involves high manufacturing costs.

DE 10 2006 006 218 A1 discloses a lifting gear with a toggle mechanism connected to a height adjustment of the lifting platform to lift or lower, respectively, a lower frame and an upper tool part connected therewith as a reaction to the displacement of the lifting platform. A disadvantage here is that the lifting gear, in particular the toggle mechanism provided thereat, for lifting the assembly comprising the lower frame and the upper tool part supported thereon involves high manufacturing costs. The reason for this is, among other things, that due to the high weight to be lifted via the toggle mechanism, a plurality of guide units at a time is required.

In the two above-described lifting means, the toggle units employed therein are primarily used for adjusting the upper tool part. To achieve this, structurally elaborate drive and guide units are required leading to high manufacturing costs.

EP 3 294 636 B1 discloses a lifting means having a lifting platform which is preferably guided by at least two guide rods during the lifting and lowering processes. The lifting means has two toggle means provided outside a machine frame. The toggle means can support a lower tool part in its lifted position, i.e., minimize a load, when the lower tool part is brought together with an upper tool part arranged above it. By the toggle means being fixed outside the machine frame, the lifting means, however, occupies an altogether large installation space.

SUMMARY

It is an object of the disclosure to provide a lifting gear with an adjusting mechanism which can be manufactured at low costs, in particular due to a reduced number of components provided thereon, and which is perfectly suited for a precise height adjustment of a lower tool part of a workstation provided at a packaging machine.

The disclosure relates to a lifting gear for opening and closing a workstation of a packaging machine, wherein the lifting gear includes a stationarily mounted base, a lifting platform mounted to be height adjustable with respect to the base along a lifting axis for supporting a lower tool part of the workstation, and an adjusting mechanism for the lifting platform comprising a drive unit and a toggle means on which the lifting platform is mounted.

According to the disclosure, the adjusting mechanism furthermore includes a pressure part adjustable by means of the drive unit, in particular along the lifting axis, and coupled to the toggle means, wherein by the displacement thereof, the toggle means can be actuated for a height adjustment of the lifting platform along the lifting axis. The adjusting mechanism for the lifting platform includes the drive unit, the pressure part height adjustable thereby, and the toggle means coupled thereto, wherein the pressure part is provided as a coupling member between the drive unit and the toggle means to transmit an adjusting force of the drive unit via the toggle means to the lifting platform so that the latter is liftable or lowerable. In the disclosure, the toggle means is thus present as a mechanical linkage between the drive unit and the lifting platform.

The adjusting force of the drive unit therefore does not act on the lifting platform for its height displacement directly but indirectly, i.e., via the toggle means connected thereto. As a mechanical linkage, the toggle means can in particular be present between the drive unit and the lifting platform as a transmission or guiding linkage. This results in the height adjustment of the lifting platform from the adjusting movements of the drive unit and the toggle means resulting along the lifting axis and which are lined up or based one upon the other. Both during the lifting and the lowering of the lifting platform, i.e., during the closing and opening of the workstation, the toggle means can advantageously utilize the toggle principle, for example, for a quick closing and opening of the workstation, whereby the throughput at the packaging machine can be increased. Such an adjusting mechanism furthermore has an altogether compact design, provides a precise guidance and is in particular characterized by the possibility of a reduced number of employed components for adjusting the lifting platform, so that the lifting gear altogether can be manufactured at low costs.

In contrast to the known lifting means, in the disclosure, the toggling means is present as a mechanical linkage, in particular as a transmission and/or guiding linkage for the lifting platform, i.e., for the lower tool part mounted thereon, and not for the upper tool part. Thereby, the adjusting movement of the drive unit can be transmitted, for example accelerated, to the lifting platform by means of the toggle means according to the toggle principle, whereby the lifting gear can be employed particularly economically. Moreover, the toggle means can prevent forces acting on the lower tool part and thus also on the lifting platform, for example a seal contact pressure, from acting directly on the drive unit.

In one variant, the toggle means includes at least two, preferably three, separate toggle joints which can be actuated together by means of a displacement of the pressure part. Thereby, the respective toggle joints can be adjusted synchronously with respect to each other to lift the lifting platform mounted thereon to the top or lower it to the bottom along the lifting axis uniformly, i.e., without the latter being tilted with respect to the horizontal.

The respective toggle joints can each have three toggles. These can be articulated to each other at ends formed thereon. With the other ends, the toggles are fixed to the base, the pressure part and the lifting platform. Accordingly, a lifting of the pressure part can cause a full extension of two toggles, i.e., a lifting of the lifting platform, and a lowering of the pressure part can cause a collapse of the two toggles, i.e., a lowering of the lifting platform.

It is conceivable that the toggle means alone supports the lifting platform. As a direct substructure for the lifting platform, thus only the toggle means supporting the same is provided. Thereby, the toggle principle can directly act on the lifting platform. This also offers advantages for the drive unit which is present as an actuator for the toggle means. For example, shorter adjusting paths are sufficient for it for actuating the toggle means, resulting in a reduction of the manufacturing costs.

Preferably, the toggle joints are arranged at a predetermined angle with respect to each other such that their common actuation functions as a linear guidance for adjusting the lifting platform along the lifting axis. The toggle joints are in this variant constructed and mounted at a certain angle with respect to each other such that they together form a guiding linkage for the lifting platform. This means that by the common simultaneously performed pivoting of the respective toggle joints alone, a movement for the lifting platform guided along the lifting axis results, i.e., the toggle joints themselves form a linear guidance for the lifting platform.

It is advantageous for the toggle means to preferably include altogether four separate toggle joints arranged in pairs cross-over in a first and a second adjusting plane. The toggles of one pair of the toggle joints can pivot in the first adjusting plane, and the toggles of the other pair of the toggle joints can pivot in the second adjusting plane. This mainly means that the adjusting planes are not arranged in parallel with respect to each other. Consequently, a particularly stable mounting on the toggle means results for the lifting platform. The toggle joints can in this variant in particular cooperate such that the lifting platform now only includes one degree of freedom, that is the one along the lifting axis. The two adjusting planes can be arranged at a predetermined angle with respect to each other which is, for example, 10° to 35° or 80° to 100°.

In particular, the first and second adjusting planes can intersect along a drive axis of the drive unit. Preferably, the drive axis and the lifting axis are flush with each other, preferably in the vertical direction. This on the one hand provides a relief of the load on the drive unit. With this arrangement, the respective toggle joints can moreover cooperate such that the lifting platform now only includes one degree of freedom along the lifting axis. Otherwise, this already results in an extremely robust linear guidance function for the lifting platform along the lifting axis, so that additional, often expensive linear guides can be omitted.

The toggle means can include, according to one variant of the embodiment, three or four separate toggle joints, wherein toggle joints arranged in pairs one next to the other are adjustable in respective adjusting planes intersecting along an intersection line extending in parallel to a drive axis of the drive unit. This permits a particularly robust displacement of the lifting platform because a stable guidance for the displacement of the lifting platform is automatically formed thereby.

For the case where four toggle joints are employed, it would be possible that a first pair of two toggle joints arranged one next to the other and a second pair of the other two toggle joints arranged one next to the other are formed, wherein the respective adjusting planes of the two toggle joint pairs intersect along intersection lines extending in parallel to the drive axis of the drive unit. By this, it is in particular possible to precisely displace heavy tools by means of the lifting gear. Preferably, the two intersection lines have the same distance to the drive axis. This provides a uniform distribution of loads during the lifting movement.

For the case where three toggle joints are employed, it would be possible that the respective adjusting planes of the three toggle joints intersect along one single intersection line extending in parallel to the drive axis of the drive unit. This results in an inexpensive construction of the lifting gear. It would in particular be possible that one of the three toggle joints is mounted such that the drive axis of the drive unit is located in its adjusting plane. This results in a robust, precisely guided adjustability of the lifting gear even if only three toggle joints are employed.

Preferably, the pressure part is embodied in the form of a plate. In this form, the pressure part has a high mechanical stiffness. As a plate-shaped coupling member, the pressure part is perfectly suited for actuating the toggle means within a small installation space.

Preferably, the toggle means is circumferentially fixed to the pressure part. The pressure part can here be surrounded by the respective toggle joints provided at the toggle means. Preferably, the pressure part can submerge into a space left free between the toggle joints for actuating the toggle joints circumferentially fixed thereto, so that altogether, a height-reduced construction results. Moreover, this simultaneously results in a stable substructure for the lifting platform mounted thereon in a height-adjustable manner, so that the lower tool part mounted thereon can absorb high forces.

Preferably, the pressure part has an X-shaped contour. Thereby, the pressure part can be manufactured with a reduced weight. Furthermore, it can provide advantageous attachment points for the toggle means at its ends provided thereby and directed outwards.

In a variant, the pressure part has an O-shaped contour, for example in the form of a disc. The disc could preferably have a diameter of between 10 cm and 30 cm. Here, the toggling means, i.e., the respective toggle joints provided thereon, could be circumferentially fixed to the disc, so that the toggle joints have distances with respect to each other which promote a stable mounting of the lifting platform.

In one embodiment, the pressure part is adjustable, by means of the drive unit, between a lowered position in which the pressure part is positioned approached to the base and a lifted position in which the pressure part is positioned spaced apart from the base. In particular, the pressure part is positioned underneath the toggle means in the vertical direction when it is located in the lowered position, while it is positioned within the toggle means in the lifted position, i.e., between the toggle joints provided thereon. Apart from a compact construction, a particularly uniform force of actuation on the surrounding toggle joints is also formed.

In one embodiment of the disclosure, the pressure part is positioned underneath lower attachment bearings provided at the base for the toggle joints in the lower position, and/or the pressure part is positioned above the lower attachment bearings provided at the base for the toggle means in the lifted position. This creates a particularly advantageous force-movement transmission ratio which is exerted on the lifting platform for its height adjustment by the toggle means in response to the toggle principle generated thereby.

Preferably, the toggle means is movable between a retracted position and an extended position in which upper attachment bearings provided at the lifting platform for the toggle means have a different, in particular smaller or larger distance with respect to each other than lower attachment bearings provided at the base for the toggle means. Thereby, the lifting platform is guided along the lifting axis free from backlash. A separate guidance is not required. The toggle means here acts as a centering unit to prevent a tilting of the lifting platform. Above all, the respective distances of the upper and lower attachment bearings can be selected such that a naturally provided backlash in the toggle joints has a negligible effect. By the centering function, it can in particular be ensured that at each lifting, the lifting platform comes to a standstill at the same position. This can in particular be of great importance if the lower tool part mounted on the lifting platform is brought together with the upper tool part mounted above it for a sealing process because very high precision is demanded to create a sealed seam precise to the nearest millimeter.

It is possible to dimension the toggle means, in particular the toggle joints formed thereon, such that the lifting platform mounted thereon remains oriented at least horizontally during a lifting movement. Thereby, the lower tool part mounted on the lifting platform can be brought together with the upper tool part arranged above it more accurately to perform a packaging process therebetween, for example a deep-drawing process or a sealing process.

According to one embodiment, the pressure part is adjustable along the lifting axis in a linearly guided manner. Thereby, the toggle joints arranged around the pressure part and fixed thereto can be precisely actuated in order to adjust the lifting platform mounted thereon along the lifting axis.

A variant which can be manufactured particularly inexpensively can be provided by the pressure part being guided on the drive side only by a retractable and extendable piston of the drive unit along the lifting axis. This means that no further linear guide is associated with the drive unit to guide the pressure part adjustable thereby.

In particular, the toggle means can be configured such that the toggle joints which are circumferentially arranged at the pressure part hold the same on the lifting axis. The toggle joints here simultaneously support the pressure part from outside during an adjusting movement so that it remains positioned along the lifting axis. The piston rod and the toggle joints together thereby offer a type of cascade guidance for the pressure part and in particular for the lifting platform. Thus, separate linear guides can be omitted.

To height-adjust large and heavy lower tool parts, the lifting gear can have at least one separate linear guide for the pressure part. It would be conceivable to provide at least one linear guide mounted next to the drive unit on the base, whereby a linear extension movement of the piston of the drive unit can be supported.

It is suitable for the drive unit to be embodied as a pneumatic cylinder or electric cylinder. These only occupy a small space at the lifting gear and can be manufactured at low costs. Preferably, only one single pneumatic cylinder or electric cylinder is employed.

The lifting gear according to the disclosure is particularly suited for being employed at a deep-drawing packaging machine or at a tray sealing machine, in particular as a lifting gear for a sealing station formed thereon, to bring a lower sealing tool part together with an upper sealing tool part arranged above it for a sealing process to be performed between them.

BRIEF DESCRIPTION OF THE DRAWINGS

Below, the disclosure will be illustrated more in detail with reference to embodiments represented in the figures. The figures show in detail.

Figure 1:
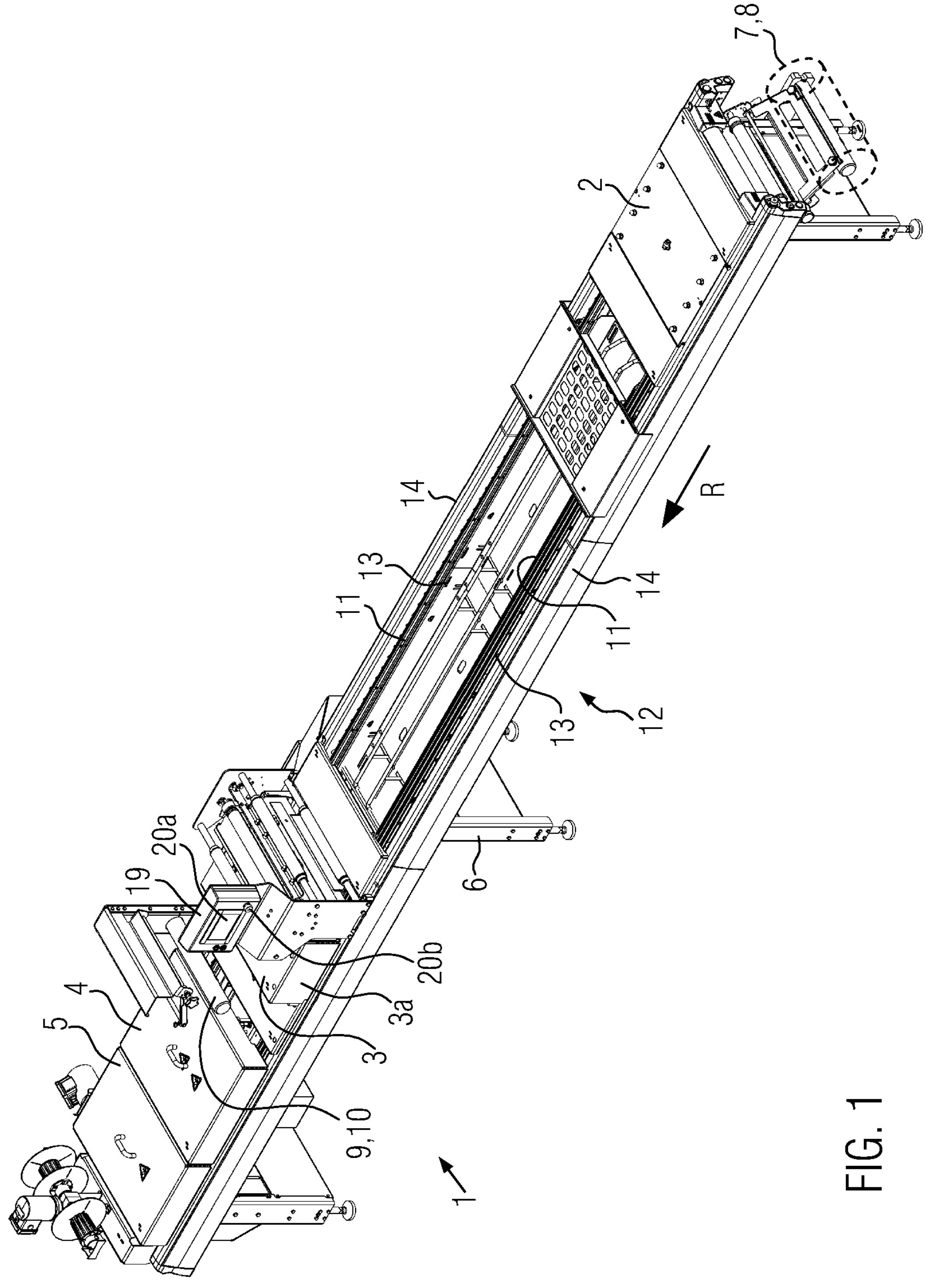
FIG. 1 shows a perspective view of a deep-drawing packaging machine.

Equal components are always provided with equal reference numerals in the figures.

DETAILED DESCRIPTION

FIG. 1 shows an intermittently operating deep-drawing packaging machine 1 in a perspective view. This deep-drawing packaging machine 1 includes a forming station 2, a sealing station 3, a cross cutter 4 and a longitudinal cutter 5 which are arranged in this sequence at a machine frame 6 in a direction of transport R. At the entry side, a feed roller 7 is located at the machine frame 6, a lower foil 8 being reeled off from said roller. Furthermore, the deep-drawing packaging machine 1 includes a transport chain 11 which grips the lower foil 8 and transports it further in the direction of transport R per main cycle, in particular transport chains or clamping chains 11, respectively, arranged at both sites.

In the represented embodiment, the forming station 2 is embodied as a deep-drawing station in which cavities are formed in the lower foil 8 by deep-drawing, for example by means of compressed air and/or a vacuum. The forming station 2 can be designed such that several cavities are formed next to each other in the direction perpendicular to the direction of transport R. In the direction of transport R downstream of the forming station 2, a filling section 12 is provided in which the cavities formed in the lower foil 8 are filled with products.

The sealing station 3 has a hermetically closable chamber 3*a* in which the atmosphere in the cavities is e.g., evacuated and/or can be replaced by a replacement gas or a gas mixture by gas flushing before the sealing with an upper foil 10 discharged by an upper foil retainer 9.

The transverse cutter 4 can be embodied as a stamping machine which cuts through the lower foil 8 and the upper foil 10 between adjacent cavities in a direction transverse to the direction of transport R. In the process, the transverse cutter 4 operates such that the lower foil 8 is not cut through across its total width, but is not cut through at least in an edge region. This permits a controlled further transport through the transport chain 11.

The longitudinal cutter 5 can be embodied as a knife arrangement by which the lower foil 8 and the upper foil 10 are cut through between adjacent cavities and at the lateral edge of the lower foil 8 in the direction of transport R so that singled packages are present downstream of the longitudinal cutter 5.

The right and left transport chains 11 of the deep-drawing packaging machine 1 which grip the lower foil 8 on both sides are each guided in a chain guide 13. These chain guides 13 are protected to the outside each by a side covering 14 of the deep-drawing packaging machine 1 and are optionally fixed to the side covering 14. The side covering 14 can be a panel.

The deep-drawing packaging machine 1 furthermore includes a control unit 19. The latter has the task of controlling and monitoring the processes running in the deep-drawing packaging machine 1. A display device 20*a* with operational controls 20*b* serves to visualize or influence the process flows in the deep-drawing packaging machine 1 for or by an operator.

Figure 2:
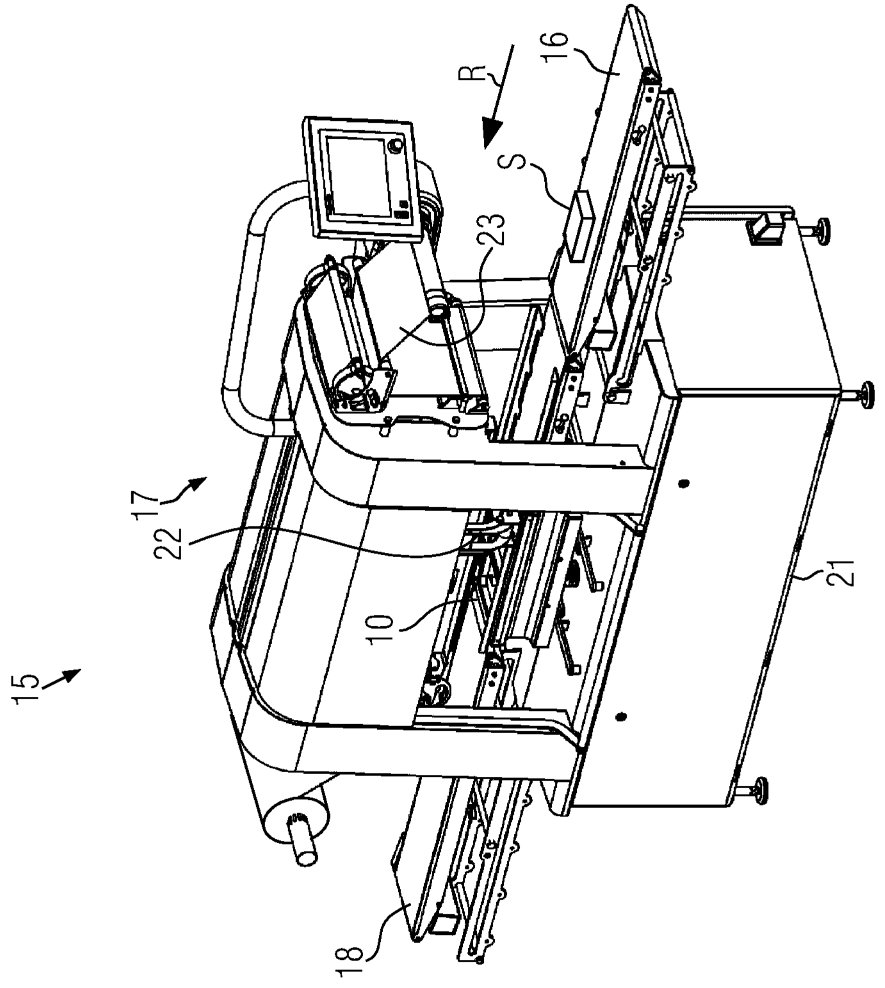
FIG. 2 shows a perspective view of a tray sealing machine.

FIG. 2 shows a tray sealing machine 15 also referred to as "tray sealer" by experts. This tray sealing machine 15 has a feed belt 16, a sealing station 17 and a discharge belt 18 which are arranged in this sequence at a machine frame 21 in the direction of transport R. Furthermore, the tray sealing machine 15 comprises a gripper means 22 by means of which prefabricated trays S can be fetched from the feed belt 16 and transported to the sealing station 17 for a sealing process performed therein. Furthermore, the gripper means 22 is embodied to grip trays S sealed within the sealing station 17 and deliver them to the discharge belt 18 for transporting them away on the latter. The unsealed trays S positioned within the sealing station 22 can be sealed by means of an upper foil 23 performed by the sealing station 22.

Figure 3A:
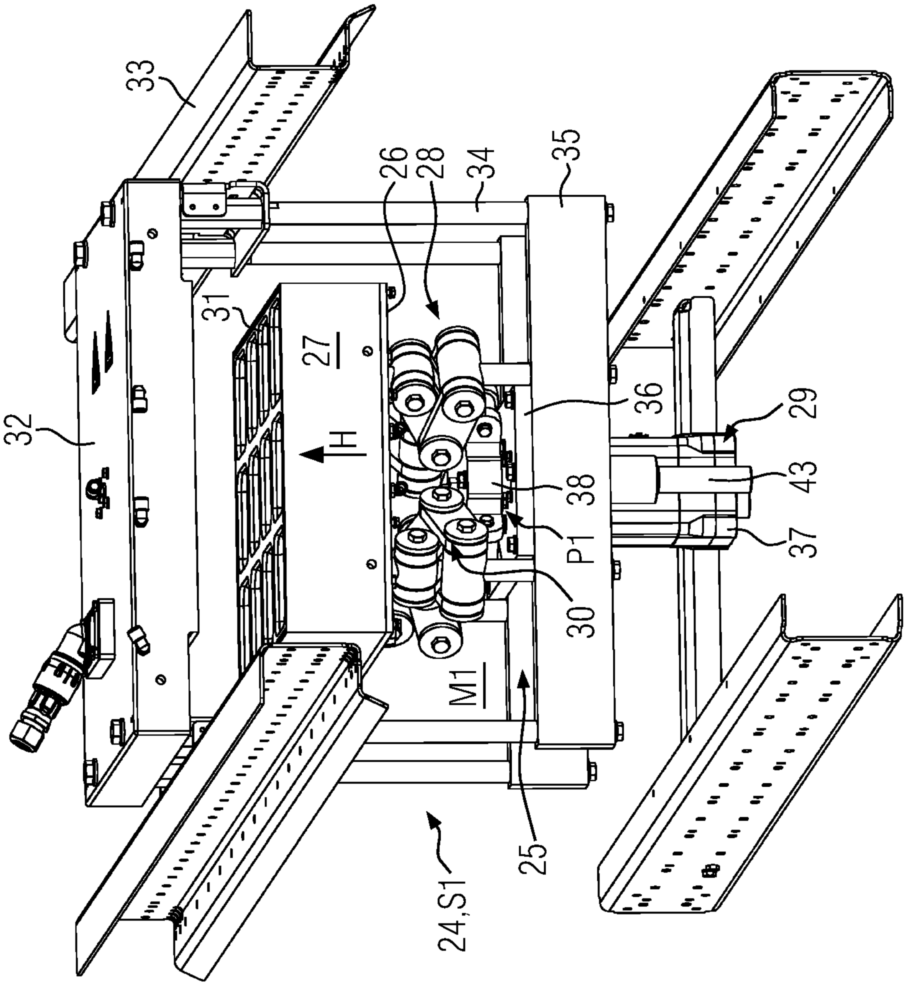
FIG. 3A shows a lifting gear according to the disclosure in an opened position.

FIG. 3A shows a lifting gear 24 for opening and closing a workstation of a packaging machine. The workstation can be present, for example, as a sealing station 3 of the deep-drawing packaging machine 1 shown in FIG. 1 or as a sealing station 17 of the tray sealer 15 shown in FIG. 2.

In FIG. 3A, the lifting gear 24 is represented in an opened position 51. The lifting gear 24 has a base 25, a lifting platform 26 mounted to be height adjustable with respect to the base 25 along a lifting axis H on which a lower tool part 27 present in the form of a tray seat 31 is positioned. The lifting gear 24 furthermore comprises an adjusting mechanism 28 which includes a drive unit 29 and a toggle means 30. In FIG. 3A, the tray seat 31 is embodied for receiving cavities which are formed along the deep-drawing packaging machine 1.

By means of the lifting gear 24, the lower tool part 27 can be brought together with an upper tool part 32 arranged above it for a packaging process, for example a sealing process. The lifting gear 24 is fixed to a machine frame 33 on both sides. The base 25 of the lifting gear 24 is connected to the machine frame 33 by means of supporting rods 34, i.e., it is stationarily mounted relative to the machine frame 33. During the operation of the lifting gear 24, i.e., during the alternating lifting and lowering of the lifting platform 26, the base 25 remains stationarily mounted.

At lower ends of the supporting rods 34, two supports 35 are fixed transverse to the direction of transport R. On the two supports 35, a base plate 36 is mounted. The supporting rods 34, the two supports 35 and the base plate 36 fixed thereto form a good bearing base 25 fixed to the machine frame 33.

FIG. 3A furthermore shows that the drive unit 29 is fixed to the base plate 36. In FIG. 3A, the drive unit 29 is embodied as a piston cylinder unit 37. The piston cylinder unit 37 is, for example, a pneumatic cylinder or an electric cylinder which is provided for adjusting the lifting platform 26 along the lifting axis H.

FIG. 3A also shows that the adjusting mechanism 28 includes a pressure part 38 coupled with the toggle means 30 and adjustable by means of the drive unit 29 along the lifting axis H, wherein by the displacements of said pressure part along the lifting axis H, the toggle means 30 can be actuated for a height adjustment of the lifting platform 26.

Figure 3B:
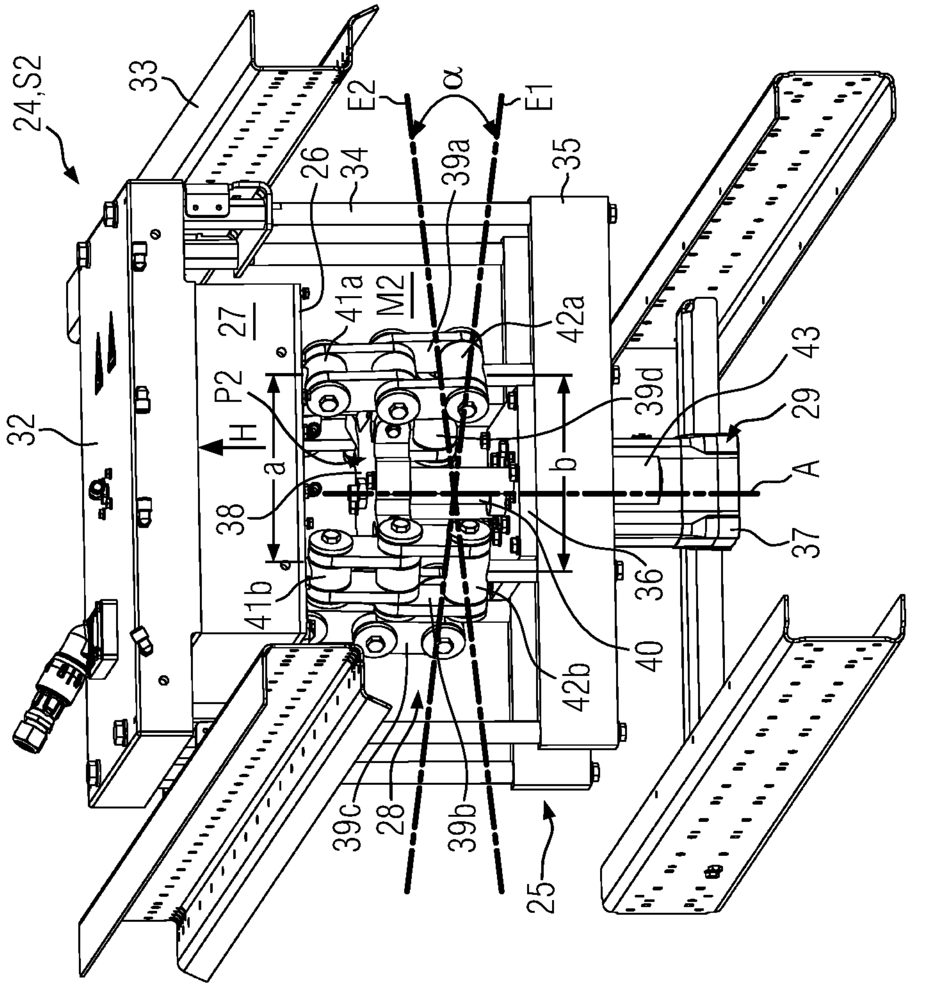
FIG. 3B shows the lifting gear according to the disclosure in a closed position.

FIG. 3B shows the lifting gear 24 in a closed position S2 in which the lower tool part 27 and the upper tool part 32 are brought together. For this, the pressure part 38, represented in a lowered position P1 in FIG. 3A in which it is positioned approached to the base plate 36, was adjusted to the lifted position P2 represented in FIG. 3B in which the pressure part 38 is positioned spaced apart from the base plate 36. In FIG. 3B, the toggle means 30 is now adjusted to an extended position M2 compared to a retracted position M1 shown in FIG. 3A.

In FIG. 3B, it can be clearly seen that the toggle means 30 has four separate toggle joints 39*a*, 39*b*, 39*c* and 39*d* (hereinafter: toggle joints 39*a* to 39*d*). The toggle joints 39*a* to 39*d* are arranged in pairs cross-over in a first and a second adjusting plane E1, E2. In particular, the respective toggles of the two toggle joints 39*a* and 39*c* can be pivoted in the adjusting plane E1, and the respective toggles of the other two toggle joints 39*b* and 39*d* can be pivoted in the adjusting plane E2. The two adjusting planes E1, E2 are arranged at a predetermined angle $\alpha$ with respect to each other. The angle $\alpha$ is present as an acute angle and is preferably 20°. According to FIG. 3B, the two adjusting planes E1, E2 intersect along a drive axis A of the drive unit 29.

FIG. 3B also shows that the piston cylinder unit 37 includes an extendable piston 40 which is adjustable along the drive axis A which is flush with the lifting axis H. The pressure part 38 fixed to an upper end of the piston 40 causes, by its displacement along the drive axis A, the toggle means 30 to move between the retracted position M1 of FIG. 3A and the extended position M2 of FIG. 3B. The toggle joints 39*a* to 39*d* of the toggle means 30 can thereby be adjusted synchronously to move the lifting platform 26 mounted thereon along the lifting axis H.

FIG. 3B also shows that in the extended position M2 of the toggle means 30, upper attachment bearings 41*a*, 41*b* have a distance a with respect to each other. Furthermore, FIG. 3B shows that lower attachment bearings 42*a*, 42*b* provided at the base 25 for the toggle means 30 have a distance b with respect to each other. The distance a of the upper attachment bearings 41*a*, 41*b* shown in FIG. 3B is smaller than the distance b present between the lower attachment bearings 42*a*, 42*b*. With this configuration, i.e., with the different distances a, b, during the lifting of the pressure part 38 via the toggle means 30, a centering function for the lifting platform 26 adjustable therewith results, so that at each lifting, it comes to a standstill at a predetermined position, i.e., at each lifting, the lower tool part 27 positioned thereon is precisely brought together with the upper tool part 32 arranged above it.

In FIGS. 3A and 3B, a linear guide 43 positioned next to the piston cylinder unit 37 is provided on the base plate 36. Two such linear guides 43 could also be provided on the base plate 36 on opposite sides of the piston 40. Nevertheless, the adjusting mechanism 28 also works without the separate linear guide 43. Here, a guided height adjustment of the lifting platform 26 along the lifting axis H results exclusively by the piston 40 of the piston cylinder unit 37 extendable along the drive axis A and the respective toggle joints 39*a* to 39*d*.

Figure 4:
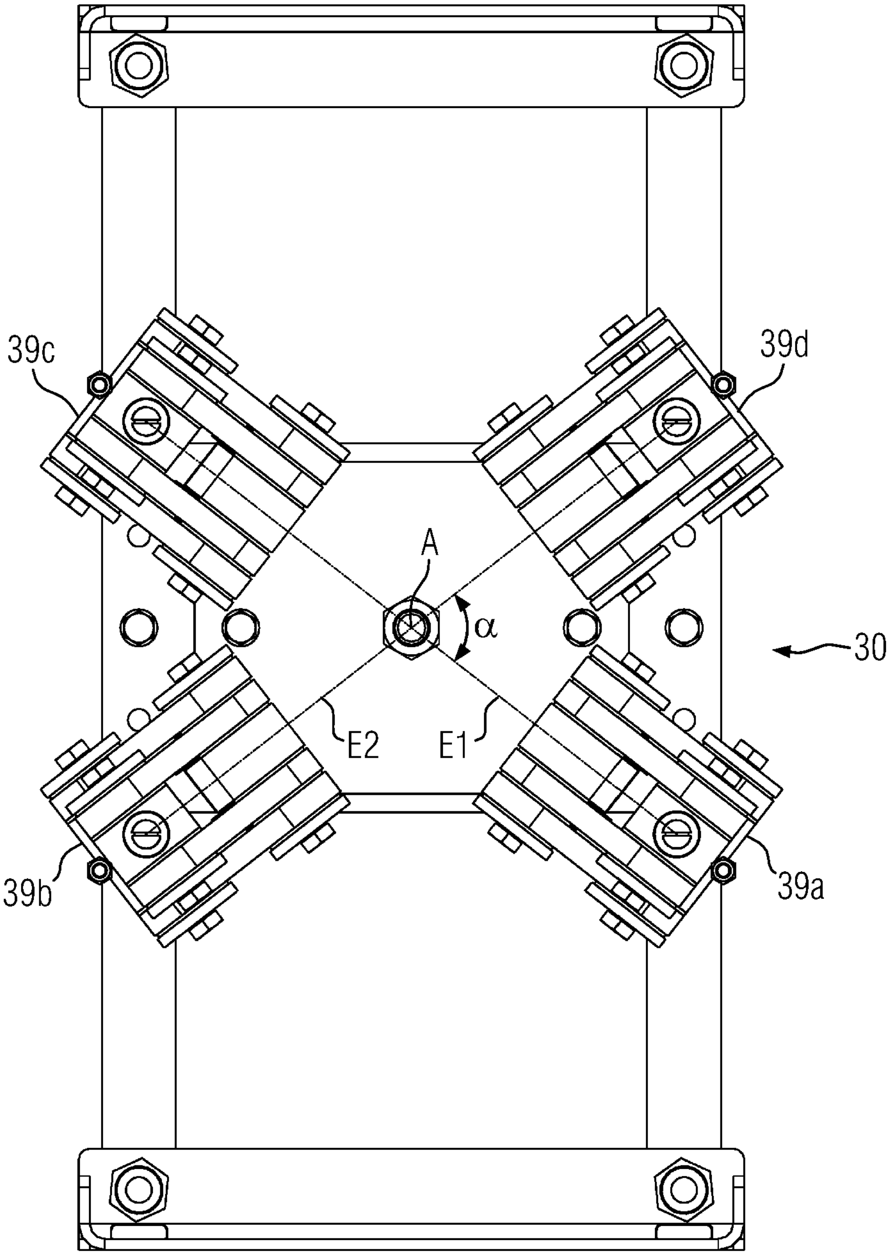
FIG. 4 shows a plan view representation of the toggle joints according to an arrangement according to the embodiment.

FIG. 4 shows the toggle means 30 mounted in FIG. 3B in a plan view. The intersection line formed by the two adjusting planes E1, E2 here corresponds to the drive axis A of the drive unit 29. The two adjusting planes E1, E2 intersect at an angle $\alpha$. The angle $\alpha$ is in particular 80° to 100°.

Figure 5:
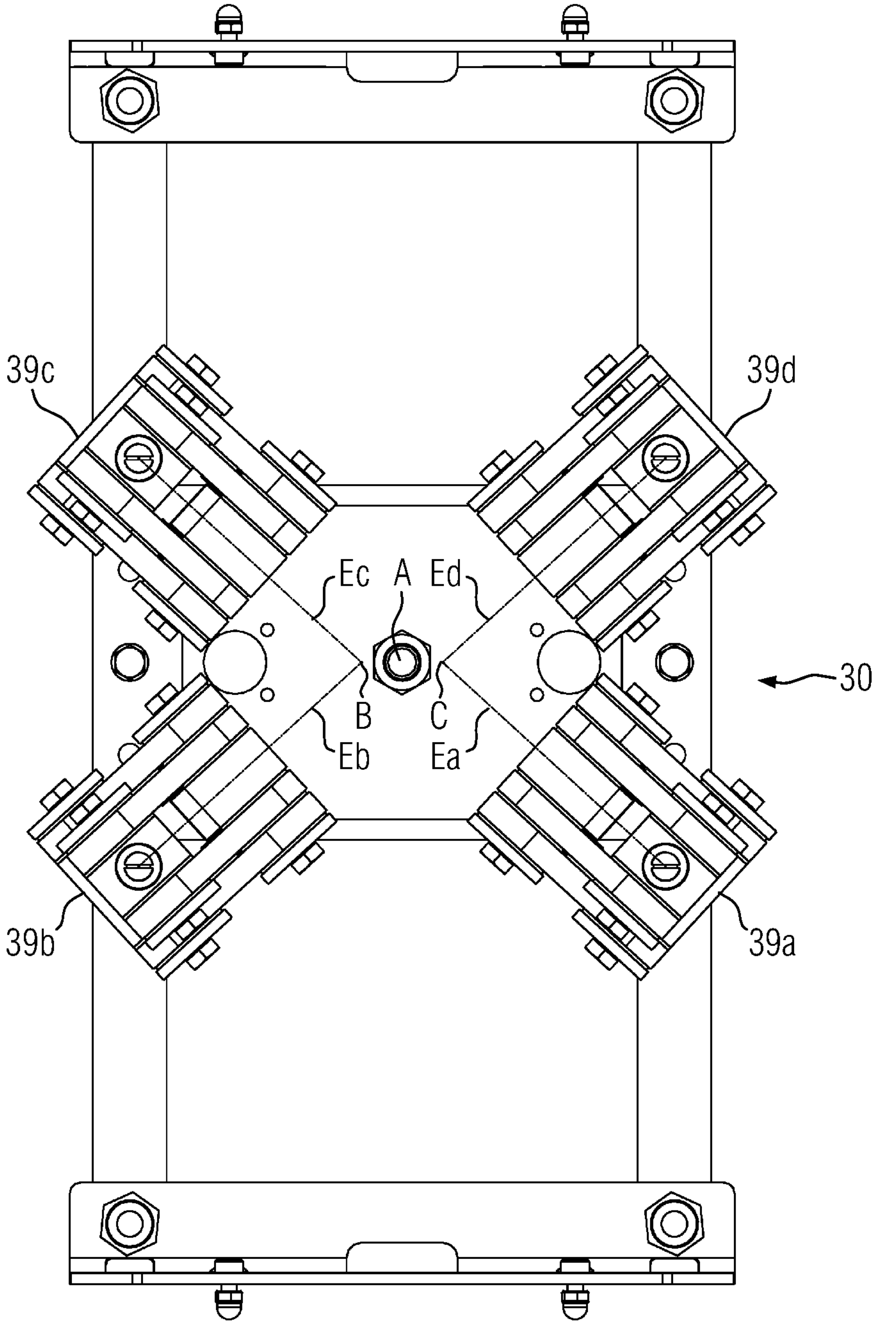
FIG. 5 shows a plan view representation of the toggle joints according to a further arrangement according to the embodiment.

FIG. 5 shows another arrangement of the four toggle joints 39*a* to 39*d*. The toggle joints 39*a* to 39*d* are adjustably mounted in respective adjusting planes Ea, Eb, Ec, Ed. The two adjusting planes Eb, Ec of the toggle joints 39*b*, 39*c* intersect in an intersection line B. The two adjusting planes Ea, Ed of the toggle joints 39*a*, 39*d* intersect in an intersection line C. The two intersection lines B, C extend in parallel to the drive axis A of the drive unit 29. FIG. 5 furthermore shows that the two intersection lines B, C extend equidistantly with respect to the drive axis A. This permits a particularly robust displacement of the lifting platform 26 because a stable guidance automatically results for it. The respective intersection line pairs Ea, Ed and Eb, Ec in particular each intersect at an angle amounting to 80° to 100°.

Figure 6:
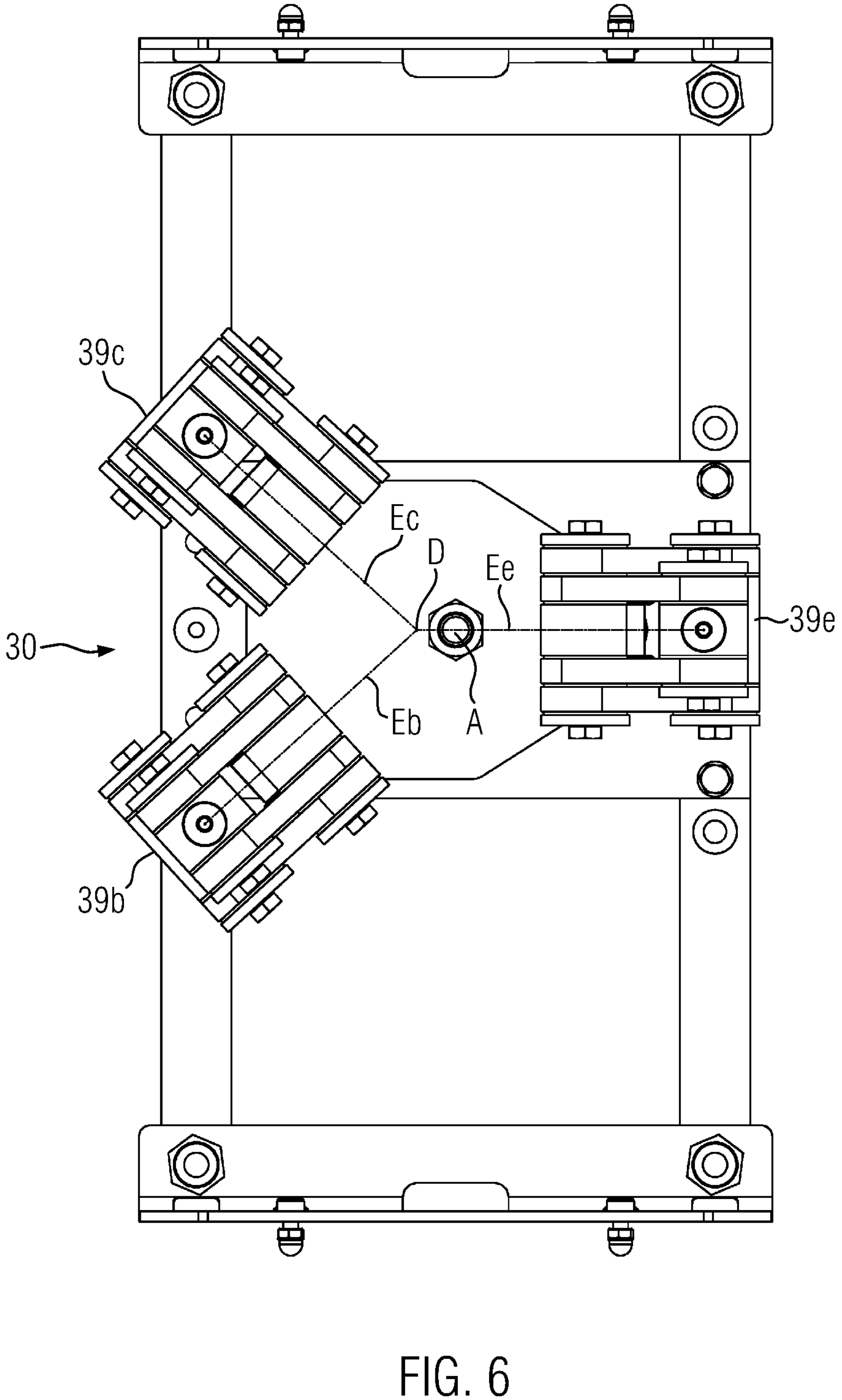
FIG. 6 shows a plan view representation of the toggle joints according to a further arrangement according to the embodiment.

FIG. 6 shows the two toggle joints 39*b*, 39*c* according to the arrangement of FIG. 5 in a plan view. FIG. 6 furthermore shows a third toggle joint 39*e* which replaces the two toggle joints 39*a*, 39*b* shown in FIG. 5. These three toggle joints 39*b*, 39*c*, 39*e* include adjusting planes Eb, Ec, Ee which intersect along one single intersection line D extending in parallel to the drive axis A of the drive unit 29. Here, the toggle joint 39*e* is mounted such that the drive axis A of the drive unit 29 is located in its adjusting plane Ee. Even if only the three toggle joints 39*b*, 39*c*, 39*e* are employed, a robust, precisely guided adjustability results for the lifting platform 26 thereby. The arrangement of the respective toggle joints 39*b*, 39*c*, 39*e* could be such that their three adjusting planes Eb, Ec, Ee each intersect at an angle of 120° with respect to each other.

What is claimed is:

1. A lifting gear for opening and closing a workstation of a packaging machine, the lifting gear comprising:

a stationarily mountable base;

a lifting platform mounted to be height adjustable with respect to the base along a lifting axis for supporting a lower tool part of the workstation; and an adjusting mechanism comprising a drive unit and a toggle means on which the lifting platform is mounted, wherein the adjusting mechanism furthermore includes a pressure part coupled with the toggle means and adjustable by means of the drive unit, wherein by displacement of the pressure part, the toggle means is actuatable for a height adjustment of the lifting platform along the lifting axis; and wherein the toggle means is movable between a retracted position and an extended position in which upper attachment bearings provided at the lifting platform for the toggle means have a different distance with respect to each other than lower attachment bearings provided at the base for the toggle means.

2. The lifting gear according to claim 1, wherein the toggle means includes at least three separate toggle joints which are actuatable together by means of a displacement of the pressure part.

3. The lifting gear according to claim 2, wherein the toggle joints are arranged at a predetermined angle with respect to each other such that their common actuation functions as a linear guide for adjusting the lifting platform along the lifting axis.

4. The lifting gear according to claim 1, wherein the toggle means includes four separate toggle joints which are arranged in pairs cross-over in first and second adjusting planes.

5. The lifting gear according to claim 4, wherein the first and second adjusting planes intersect along a drive axis of the drive unit.

6. The lifting gear according to claim 1, wherein the toggle means includes three or four separate toggle joints, wherein toggle joints arranged in pairs next to each other are adjustable in respective adjusting planes which intersect along an intersection line extending in parallel to a drive axis of the drive unit.

7. The lifting gear according to claim 1, wherein the pressure part is present in the form of a plate.

8. The lifting gear according to claim 7, wherein the toggle means is circumferentially fixed to the plate.

9. The lifting gear according to claim 1, wherein the pressure part is present in the form of a plate and has an X-shaped or O-shaped contour.

10. The lifting gear according to claim 1, wherein the pressure part has an X-shaped contour.

11. The lifting gear according to claim 1, wherein the pressure part has an O-shaped contour.

12. The lifting gear according to claim 1, wherein the pressure part is adjustable, by means of the drive unit, between a lowered position in which the pressure part is positioned approached to the base and a lifted position in which the pressure part is positioned to be spaced apart from the base.

13. The lifting gear according to claim 12, wherein the pressure part is positioned in the lowered position underneath lower attachment bearings provided at the base for the toggle means, and/or the pressure part is positioned in the lifted position above the lower attachment bearings provided at the base for the toggle means.

14. The lifting gear according to claim 1, wherein the pressure part is adjustable along the lifting axis in a linearly guided manner.

15. The lifting gear according to claim 14, wherein the pressure part is guided along the lifting axis on the drive side only by a retractable and extendable piston of the drive unit, or the lifting gear has at least one separate linear guidance for the pressure part.

16. The lifting gear according to claim 1, wherein the drive unit is embodied as a pneumatic cylinder or as an electric cylinder.

17. The lifting gear according to claim 1, wherein the toggle means comprises a linkage.

18. A deep-drawing packaging machine or tray sealing machine comprising the lifting gear according to claim 1.

* * * * *